United States Patent
Patil

(10) Patent No.: US 11,968,639 B2
(45) Date of Patent: Apr. 23, 2024

(54) VEHICULAR CONTROL SYSTEM WITH SYNCHRONIZED COMMUNICATION BETWEEN CONTROL UNITS

(71) Applicant: Magna Electronics Inc., Auburn Hills, MI (US)

(72) Inventor: Gaurav Shrikant Patil, Munich (DE)

(73) Assignee: Magna Electronics Inc., Auburn Hills, MI (US)

( * ) Notice: Subject to any disclaimer, the term of this patent is extended or adjusted under 35 U.S.C. 154(b) by 268 days.

(21) Appl. No.: 17/454,329

(22) Filed: Nov. 10, 2021

(65) Prior Publication Data

US 2022/0150854 A1     May 12, 2022

Related U.S. Application Data

(60) Provisional application No. 63/199,154, filed on Dec. 10, 2020, provisional application No. 63/198,761, filed on Nov. 11, 2020.

(51) Int. Cl.
*H04W 56/00* (2009.01)
*H04W 4/40* (2018.01)

(52) U.S. Cl.
CPC .......... *H04W 56/004* (2013.01); *H04W 4/40* (2018.02)

(58) Field of Classification Search
CPC .............................. H04W 56/004; H04W 4/40
See application file for complete search history.

(56) References Cited

U.S. PATENT DOCUMENTS

| | | |
|---|---|---|
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |

(Continued)

FOREIGN PATENT DOCUMENTS

| | | | | |
|---|---|---|---|---|
| CN | 1812317 A | * | 8/2006 | |
| WO | WO-2011074529 A1 | * | 6/2011 | ........... H04J 3/0667 |
| WO | WO-2018211761 A1 | * | 11/2018 | ........... H04L 12/28 |

*Primary Examiner* — Samina F Choudhry
(74) *Attorney, Agent, or Firm* — HONIGMAN LLP

(57) ABSTRACT

A vehicular control system includes a first electronic control unit (ECU) and a second ECU disposed at a vehicle. The first and second ECUs are in digital communication with one another via a communication link. The first ECU transmits a first frame to the second ECU, which, responsive to receiving the first frame from the first ECU, transmits a second frame to the first ECU. The first ECU, responsive to receiving the second frame from the second ECU, determines a propagation delay based on an amount of time between when the first ECU transmitted the first frame to the second ECU and when the first ECU received the second frame from the second ECU. The first ECU, responsive to determining the propagation delay, transmits a time synchronization frame to the second ECU that is based at least in part on the determined propagation delay.

21 Claims, 5 Drawing Sheets

(56) References Cited

U.S. PATENT DOCUMENTS

| | | |
|---|---|---|
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,204,778 A | 4/1993 | Bechtel |
| 5,208,701 A | 5/1993 | Maeda |
| 5,245,422 A | 9/1993 | Borcherts et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Lino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,024 A | 8/2000 | Stam et al. |
| 6,100,799 A | 8/2000 | Fenk |
| 6,144,022 A | 11/2000 | Tenenbaum et al. |
| 6,175,300 B1 | 1/2001 | Kendrick |
| 6,178,034 B1 | 1/2001 | Allemand et al. |
| 6,201,642 B1 | 3/2001 | Bos |
| 6,202,164 B1 | 3/2001 | Gulick |
| 6,223,114 B1 | 4/2001 | Boros et al. |
| 6,227,689 B1 | 5/2001 | Miller |
| 6,266,082 B1 | 7/2001 | Yonezawa et al. |
| 6,266,442 B1 | 7/2001 | Laumeyer et al. |
| 6,279,058 B1 | 8/2001 | Gulick |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,310,611 B1 | 10/2001 | Caldwell |
| 6,317,057 B1 | 11/2001 | Lee |
| 6,320,282 B1 | 11/2001 | Caldwell |
| 6,333,759 B1 | 12/2001 | Mazzilli |
| 6,353,392 B1 | 3/2002 | Schofield et al. |

(56) References Cited

U.S. PATENT DOCUMENTS

| | | |
|---|---|---|
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,534,884 B2 | 3/2003 | Marcus et al. |
| 6,539,306 B2 | 3/2003 | Turnbull |
| 6,547,133 B1 | 4/2003 | Devries, Jr. et al. |
| 6,553,130 B1 | 4/2003 | Lemelson et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjonell |
| 6,762,867 B2 | 7/2004 | Lippert et al. |
| 6,794,119 B2 | 9/2004 | Miles |
| 6,795,221 B1 | 9/2004 | Urey |
| 6,806,452 B2 | 10/2004 | Bos et al. |
| 6,819,231 B2 | 11/2004 | Berberich et al. |
| 6,823,241 B2 | 11/2004 | Shirato et al. |
| 6,824,281 B2 | 11/2004 | Schofield et al. |
| 6,850,156 B2 | 2/2005 | Bloomfield et al. |
| 6,889,161 B2 | 5/2005 | Winner et al. |
| 6,909,753 B2 | 6/2005 | Meehan et al. |
| 6,946,978 B2 | 9/2005 | Schofield |
| 6,975,775 B2 | 12/2005 | Rykowski et al. |
| 6,989,736 B2 | 1/2006 | Berberich et al. |
| 7,004,606 B2 | 2/2006 | Schofield |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,195,381 B2 | 3/2007 | Lynam et al. |
| 7,202,776 B2 | 4/2007 | Breed |
| 7,227,611 B2 | 6/2007 | Hull et al. |
| 7,365,769 B1 | 4/2008 | Mager |
| 7,460,951 B2 | 12/2008 | Altan |
| 7,490,007 B2 | 2/2009 | Taylor et al. |
| 7,526,103 B2 | 4/2009 | Schofield et al. |
| 7,592,928 B2 | 9/2009 | Chinomi et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,855,755 B2 | 12/2010 | Weller et al. |
| 7,881,496 B2 | 2/2011 | Camilleri et al. |
| 7,952,490 B2 | 5/2011 | Fechner et al. |
| 8,013,780 B2 | 9/2011 | Lynam |
| 8,027,029 B2 | 9/2011 | Lu et al. |
| 8,849,495 B2 | 9/2014 | Chundrik, Jr. et al. |
| 9,227,568 B1 | 1/2016 | Hubbell et al. |
| 9,387,813 B1 | 7/2016 | Moeller et al. |
| 9,481,301 B2 | 11/2016 | Schaffner |
| 9,912,841 B2 | 3/2018 | Schaffner |
| 10,171,709 B2 | 1/2019 | Schaffner |
| 10,560,610 B2 | 2/2020 | Schaffner |
| 10,958,830 B2 | 3/2021 | Koravadi |
| 11,554,727 B2 | 1/2023 | Vaid et al. |
| 2002/0015153 A1 | 2/2002 | Downs |
| 2002/0113873 A1 | 8/2002 | Williams |
| 2003/0081935 A1 | 5/2003 | Kirmuss |
| 2003/0125854 A1 | 7/2003 | Kawasaki et al. |
| 2003/0137586 A1 | 7/2003 | Lewellen |
| 2003/0222982 A1 | 12/2003 | Hamdan et al. |
| 2004/0114381 A1 | 6/2004 | Salmeen et al. |
| 2005/0225636 A1 | 10/2005 | Maemura et al. |
| 2005/0285938 A1 | 12/2005 | Suzuki et al. |
| 2006/0018511 A1 | 1/2006 | Stam et al. |
| 2006/0018512 A1 | 1/2006 | Stam et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0250501 A1 | 11/2006 | Widmann et al. |
| 2006/0257140 A1 | 11/2006 | Seger et al. |
| 2006/0290479 A1 | 12/2006 | Akatsuka et al. |
| 2007/0104476 A1 | 5/2007 | Yasutomi et al. |
| 2007/0206945 A1 | 9/2007 | DeLorme et al. |
| 2008/0189036 A1 | 8/2008 | Elgersma |
| 2009/0002491 A1 | 1/2009 | Haler |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0245223 A1 | 10/2009 | Godfrey |
| 2009/0265069 A1 | 10/2009 | Desbrunes |
| 2009/0278933 A1 | 11/2009 | Maeda et al. |
| 2010/0020170 A1 | 1/2010 | Higgins-Luthman et al. |
| 2010/0228437 A1 | 9/2010 | Hanzawa et al. |
| 2010/0231771 A1 | 9/2010 | Yaghmai |
| 2011/0069170 A1 | 3/2011 | Emoto et al. |
| 2011/0193961 A1 | 8/2011 | Peterson |
| 2012/0044066 A1 | 2/2012 | Mauderer et al. |
| 2012/0062743 A1 | 3/2012 | Lynam et al. |
| 2012/0075465 A1 | 3/2012 | Wengrovitz et al. |
| 2012/0162436 A1 | 6/2012 | Cordell et al. |
| 2012/0188355 A1 | 7/2012 | Omi et al. |
| 2012/0218412 A1 | 8/2012 | Dellantoni et al. |
| 2012/0262340 A1 | 10/2012 | Hassan et al. |
| 2012/0320207 A1 | 12/2012 | Toyofuku |
| 2013/0038681 A1 | 2/2013 | Osipov et al. |
| 2013/0124052 A1 | 5/2013 | Hahne |
| 2013/0129150 A1 | 5/2013 | Saito |
| 2013/0131918 A1 | 5/2013 | Hahne |
| 2014/0067206 A1 | 3/2014 | Pflug |
| 2014/0071234 A1 | 3/2014 | Millett |
| 2014/0156157 A1 | 6/2014 | Johnson et al. |
| 2014/0222280 A1 | 8/2014 | Salomonsson et al. |
| 2014/0313339 A1 | 10/2014 | Diessner |
| 2014/0328357 A1* | 11/2014 | Fredriksson ........ H04L 12/4135 370/520 |
| 2014/0379233 A1 | 12/2014 | Chundrlik, Jr. et al. |
| 2015/0134864 A1* | 5/2015 | Foster ...................... G06F 1/12 710/106 |
| 2016/0264071 A1* | 9/2016 | Ujiie .................... H04L 9/3242 |
| 2019/0356404 A1* | 11/2019 | Kaku .................. H04L 49/9084 |

* cited by examiner

Frame format for synchronization message

| Frame type | Time stamp seconds | Time stamp Nano seconds | Correction time Seconds (Tc = Tp + Tb) | Correction time nano seconds |
|---|---|---|---|---|

FIG. 2

VEHICULAR CONTROL SYSTEM WITH SYNCHRONIZED COMMUNICATION BETWEEN CONTROL UNITS

CROSS REFERENCE TO RELATED APPLICATIONS

The present application claims the filing benefits of U.S. provisional application Ser. No. 63/199,154, filed Dec. 10, 2020, and U.S. provisional application Ser. No. 63/198,761, filed Nov. 11, 2020, which are hereby incorporated herein by reference in their entireties.

FIELD OF THE INVENTION

The present invention relates generally to a vehicle control system for a vehicle and, more particularly, to a vehicle control system that synchronizes control units.

BACKGROUND OF THE INVENTION

Use of time synchronization between modules in a control system is common and known.

SUMMARY OF THE INVENTION

A vehicular control system includes a first electronic control unit (ECU) disposed at a vehicle equipped with the vehicular control system. The system includes a second ECU disposed at the equipped vehicle. The first ECU and the second ECU are in digital communication with one another via a communication link. The digital communication via the communication link includes communication of a first frame and communication of a second frame. The first ECU transmits the first frame to the second ECU via the communication link. The first frame includes a first bit pattern having a first sequence of binary digits. The second ECU, responsive to receiving the first frame from the first ECU, transmits the second frame to the first ECU via the communication link. The second frame includes a second bit pattern having a second sequence of binary digits. The first ECU, responsive to receiving the second frame from the second ECU, determines a propagation delay based on a time interval between (i) when the first ECU transmits the first frame to the second ECU and (ii) when the first ECU receives the second frame from the second ECU. The first ECU transmits a time synchronization frame to the second ECU via the communication link. The time synchronization frame is based at least in part on the determined propagation delay.

These and other objects, advantages, purposes and features of the present invention will become apparent upon review of the following specification in conjunction with the drawings.

BRIEF DESCRIPTION OF THE DRAWINGS

FIG. 2 is a table for a frame format for a synchronization message;

DESCRIPTION OF THE PREFERRED EMBODIMENTS

Many vehicle systems require an accurate clock or time to properly function. Thus, it is often important to accurately synchronize time between different vehicle systems, controllers, sensors, and/or modules. Vehicle time is commonly distributed by a master clock to a slave clock using, for example, the precision time protocol (PTP). Time synchronization using PTP requires two distinct communication frames (i.e., a sync frame and follow-up frame), such as two Ethernet frames, that can be sent cyclically. Precision time protocol also includes PDelay requests and PDelay responses that add additional Ethernet frames. In total, four Ethernet frames are needed to synchronize time at a slave electronic control unit (ECU) from master ECU using PTP. Implementations herein include a vehicular control system that provides time synchronization with a single Ethernet frame that includes a timestamp, thus reducing overhead for synchronization between controls. These implementations may be applied to any topology or to multi-time master ECUs.

In the vehicular control system described herein, a time master ECU sends a timestamp of the current time in a single Ethernet frame along with propagation delay corrections and back off time corrections. A receiver and/or time slave ECU (i.e., a second ECU independent or separate from the time master ECU) receives the single Ethernet frame with the timestamp and correction time attached to or within. The propagation time and back off time may be calculated by the transceiver of the time master ECU transmitting the frame using, for example, an internal hardware timer module.

Figure 1:
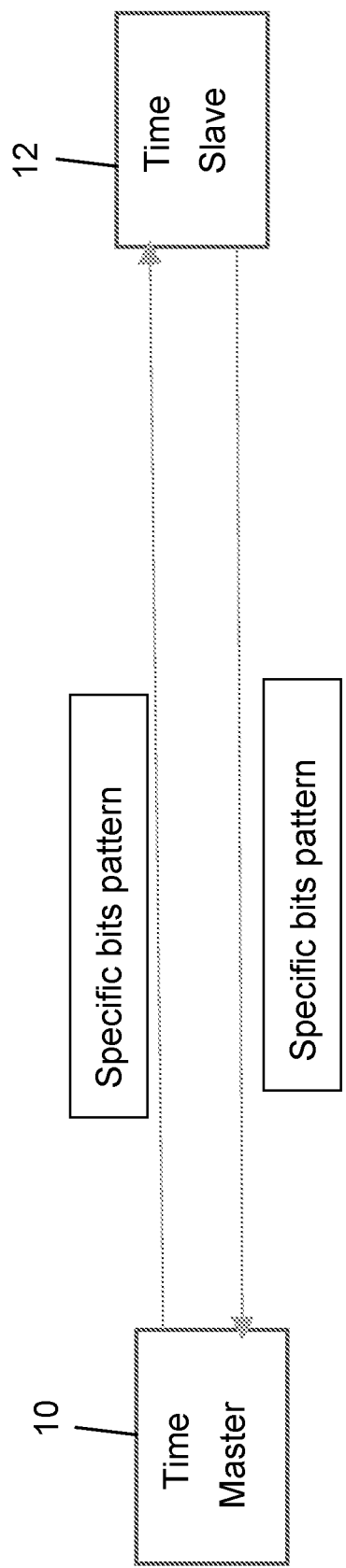
FIG. 1 is a schematic view of a time master electronic control unit and a time slave electronic control unit exchanging bit patterns.

Referring now to FIG. 1, the propagation delay may be determined by first, after power on, linking up a time master ECU transceiver 10 and a time slave ECU transceiver 12. To establish the link, each transceiver sends a pattern of pulses (i.e., logic '0' signals and logic '1' signals) and receives back a pattern of pulses. Using these pulses, the transceivers can negotiate a link for communication between the time master ECU and the time slave ECU. The amount of time required for setting up the link may vary based on the specific Ethernet transceivers. Once the link is established, the time master ECU sends a special or specific bits pattern for measuring propagation delay.

For example, the Ethernet transceiver of the time master ECU sends specific patterns of bits, such as the binary number "1010101010101111," that indicates the calculation for propagation delay and starts an internal hardware timer. The Ethernet transceiver of the time slave ECU receives the pattern of bits transmitted by the time master ECU and responds with another specific pattern, such as the binary number "1010101011111111." The time master ECU transceiver receives back the response from the time slave ECU and stops the internal hardware timer that the time master ECU started when sending the initial specific pattern of bits. The time master ECU divides the results of the timer by 2 as the timer timed both transmission and reception of the patterns. The timer measures the propagation time (Tp) with no Ethernet traffic. This time Tp should be added to every timestamp frame as the correction or time needed for communication from one transceiver to other (i.e., the time for a signal to propagate from one ECU to the other ECU). The transceiver of the time master ECU stores this Tp in a hardware register (FIG. 5) during the execution cycle. This time Tp may be added to every outgoing time synchronization frame.

Referring now to FIG. 2, optionally, the vehicular control system provides additional time corrections. For example, another useful time correction is when there is Ethernet traffic on a bus and the time master ECU is waiting for bus to be free. The Ethernet transceiver at the time master ECU may listen on the physical medium (i.e., of the bus) to determine when the medium is free and when the time sync message must be transmitted. If the medium is free, the back off time is set to 0 and only Tp is valid (i.e., the only delay is the propagation delay). The Ethernet transceiver of the time master ECU detects the timestamp frame for transmission by checking the frame type. It starts the internal hardware timer from when the physical medium is occupied until the medium is free for transmitting a frame. If the frame results in "back off" due to a collision (i.e., two or more transceivers each sent a frame at the same time resulting in both entering back off) on the physical medium, the timer resumes from the last point it had stopped (i.e., from the point where the frame was sent). Once the frame is transmitted, this back off time Tb is added to propagation time Tp and sent along with the frame. Thus, in this scenario, Tp+Tb (i.e., the sum of Tp and Tb) is the total propagation time for sending timestamp frames from time master ECU to time slave ECU. This sum results in Tc, which is the total correction time the time slave ECU receives when receiving the frame with the timestamp (i.e., the time slave ECU adjusts the timestamp by Tc).

The frame type may be a 16 bit field to indicate time sync frame. Other sized bit fields are also possible (e.g., 8 bits, 32 bits, 64 bits, etc.). The time stamp seconds may be a 32 or 64 bit field for the seconds generated on the time master ECU. The time stamp Nanoseconds may be, for example, a 32 or 64 bit field for the nanoseconds generated on the time master ECU. The correction time seconds may be, for example, an 8 bit or 16 bit field for the correction time in seconds. Correction time may include the sum of propagation time (Tp) and back off time (Tb) and correction time from the previous transmission (Tpc). The correction time nanoseconds may be, for example, a 32 bit field for nanoseconds. The correction time includes the sum of propagation time (Tp) with back off time (Tb) and correction time from the previous transmission (Tpc).

Figure 3:
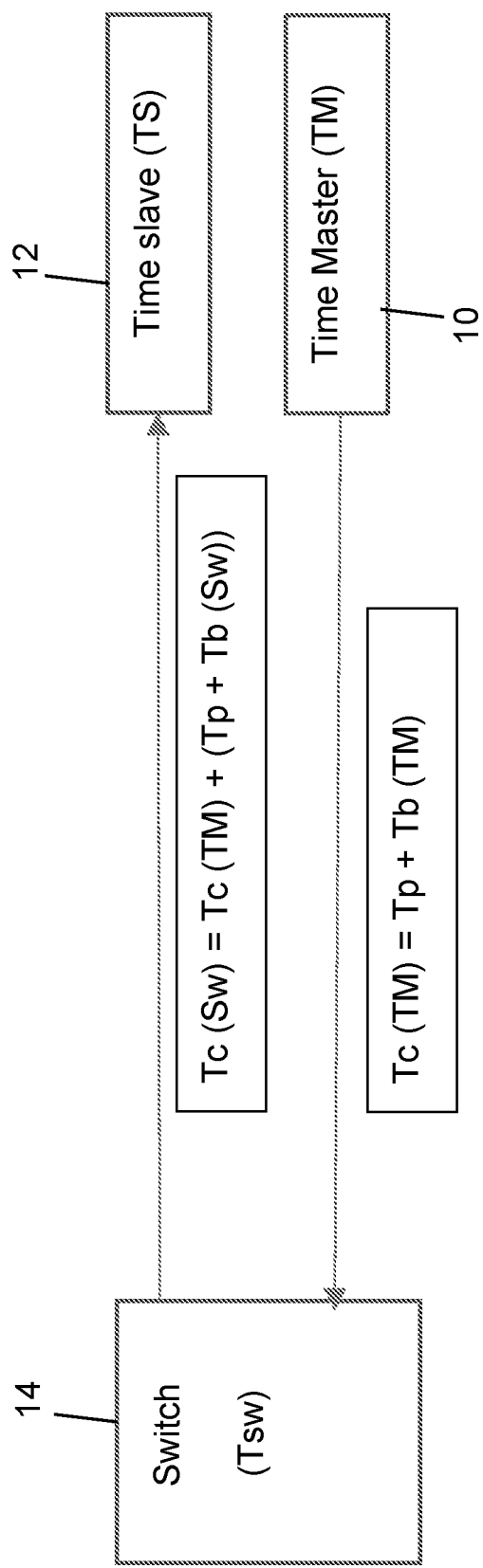
FIG. 3 is a schematic view of total propagation delay determination for the time slave electronic control unit and the time master electronic control unit of FIG. 1 when a switch device is used.

Referring now to FIG. 3, optionally, when there are multiple devices in between the time master ECU and the time slave ECU (i.e., intermediary devices), the correction time is added accordingly. Both the timestamp (i.e., the propagation delay Tp and the back off delay Tb) and Tc should generally be considered for synchronization time. The total correction time Tc may be the time sent by a previous master switch device 14 (i.e., Tsw) which receives frames from the time master ECU and forwards the frames to the time slave ECU. For each connection of ECUs, the time Tc is calculated by the same method as described above. Additionally, the time correction from the previous link (Tpc) is added to current the Tc to have an accurate correction in time.

Figure 4:
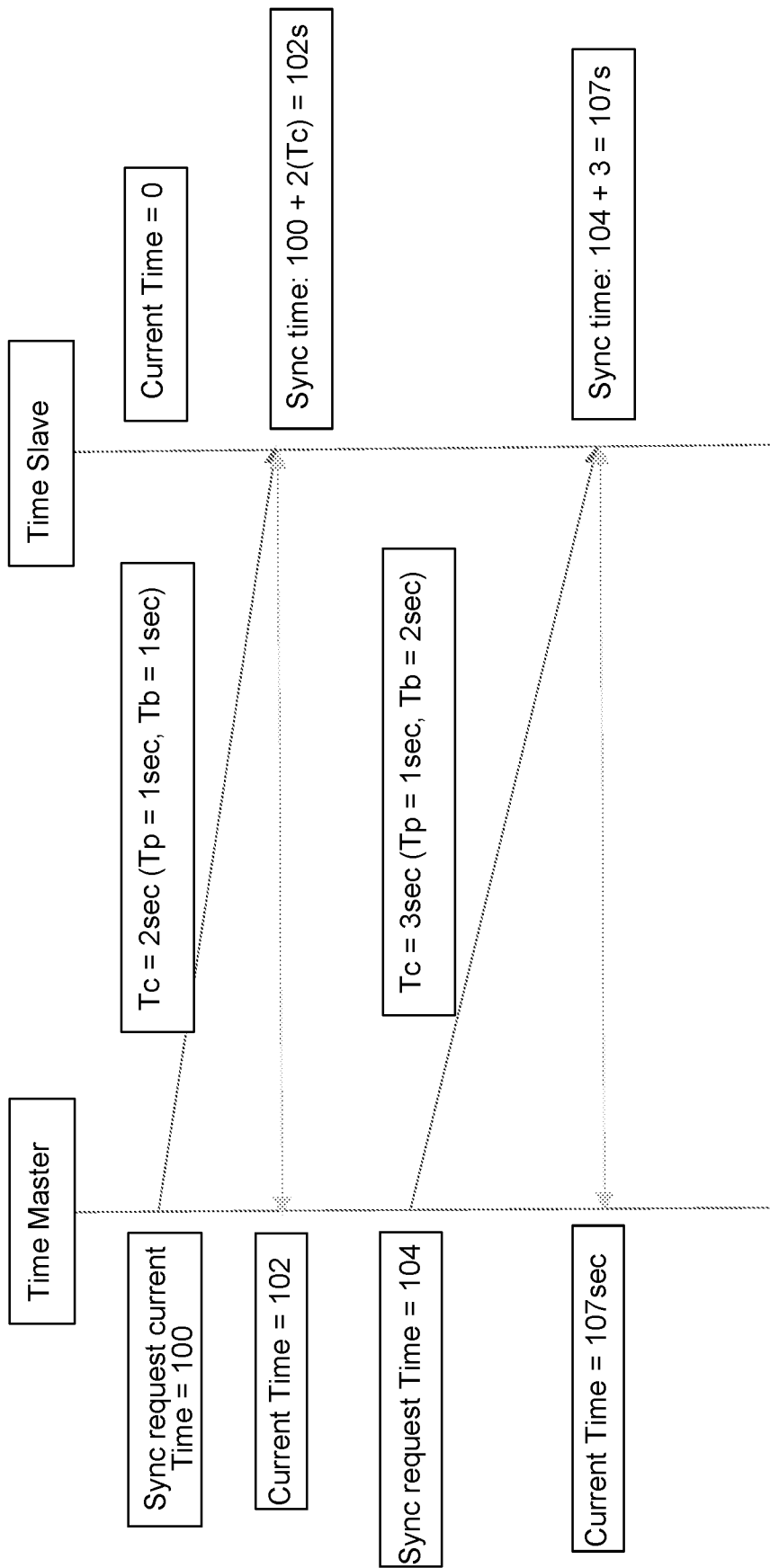
FIG. 4 is a diagram of time synchronization between the time master electronic control unit and the time slave electronic control unit of FIG. 1.

Referring now to FIG. 4, an example for synchronizing time from time master to time slave ECU is illustrated. In this example, the time master ECU begins synchronizing when a time value is equal to 100 seconds. After the initial link establishment, propagation time is measured as Tp=1 second. This time is added for every synchronization request from master along with back off time (Tb). In the first synchronization request, Tb=1 second. Thus, the time slave ECU receives time=100 seconds+2 seconds=102 seconds. The slave ECU synchronizes to the time 102 seconds based on the correction sent with the timestamp. During the second synchronization request, at a time value of 104 seconds (i.e., 4 seconds after the initial starting time value of 100 seconds), at the time master ECU, Tc=3 s. Thus, the time slave ECU synchronizes to 107 seconds. Thus, the time master and the time slave ECUs are synchronized accurately with a common time.

Ingress timestamp and egress timestamp corrections may not be considered in the timestamp fields in the frame format. The time should be corrected to the exact point in time at the time master ECU when the frame is assembled in the Ethernet MAC descriptor and is ready for transmission. In the case when the packets are queued in the descriptor chain, the final time should be used when the frame is transmitted from the Ethernet controller (MAC) to the Ethernet transceiver (TRCV) to achieve exact time synchronization. Similarly, the time slave ECU implements correction in time from the received frame until the processing of the synchronization frame. This correction is added to the synchronized time for increased accuracy.

Figure 5:
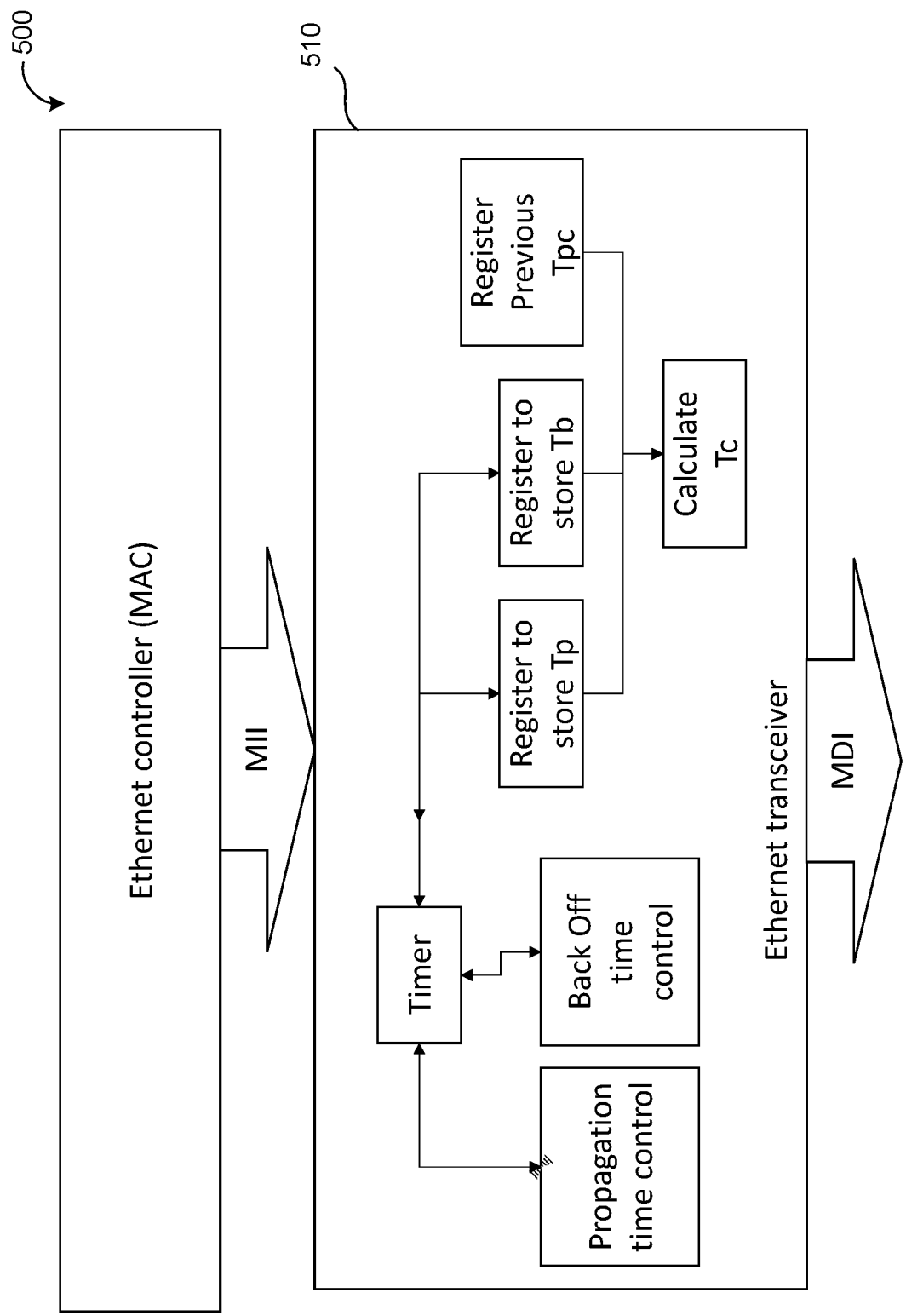
FIG. 5 is a block diagram for a transceiver with a timer for calculation of propagation delay.

Referring now to FIG. 5, the block diagram 500 of the transceiver 510 includes a propagation time control block that controls the sending and receiving of the specific bit patterns for measuring the propagation delay. The propagation time control may also access the internal hardware timer to start the timer, stop the timer, and access register values. A back off time control block controls the internal hardware timer when a back off is detected on the physical medium. The back off time control may also access the internal hardware timer to start the timer, stop the timer, and copy values. The internal hardware timer may be a free running timer. A register to store Tp, a register to store Tb, and a register to store Tpc are each registers that store Tp, Tb, and Tpc respectively (i.e., store the respective times). The "Calculate Tc" block consolidates all of the stored times (i.e., Tp, Tb, and Tpc) together and updates, in the time synchronization frame, for field correction time Tc.

Thus, the vehicular control system allows for a time master ECU to synchronize time with other ECUs with a single Ethernet frame that includes a timestamp. The single Ethernet frame includes a correction time for achieving synchronization with reduced traffic on time sync frames. In conventional time sync methods using PTP, sync and follow-up messages are configured for 125 ms and PDelay requests and responses for 1 second. In this case, 18 frames per second are needed for time synchronization. This adds additional traffic on the Ethernet bus. However, this additional traffic is greatly reduced by the vehicular control system described herein. For example, as opposed to 18 frames per second, the vehicular control system can be used in such a way that sync requests (of a single Ethernet frame) are sent every 125 ms using only low-level hardware (i.e., within the transceiver). This example results in 8 frames per second which is a reduction of greater than 50 percent. Because the transceiver sends/recognizes the bit patterns (i.e., the binary sequence of '1's and '0's) within the hardware of the transceiver, the system allows for rapid and accurate propagation delay that does not incur the overhead costs and delays of software processing. Because the amount of Ethernet traffic used by the automotive industry is increasing rapidly, the bandwidth on the Ethernet bus is becoming a notable problem between communication partners. Thus, the bandwidth reductions achieved by the vehicular control system are advantageous.

In conventional Ethernet systems, propagation delay is calculated with transmission of multiple Ethernet frames with pdelay request and pdelay response frames. Software is then used to calculate the propagation delay. In contrast, implementations herein include a system that determines propagation delay using Ethernet transceiver hardware (as opposed to software) and a single Ethernet frame (as opposed to multiple Ethernet frames). The system uses bit pattern exchanges from one transceiver to another to measure propagation delay. The Ethernet transceivers can send propagation delays for each transmitted Ethernet frame in the frame itself. Propagation delay between the communication partners is thus calculated in the same Ethernet frame instead of a traditional request/response format.

The ECU, such as the master ECU and/or slave ECU (i.e., a first ECU and/or a second ECU), may be part of a driving assist system of the vehicle. For example, one or both of the ECUs may generate a respective output for one or more driving assist systems of the vehicle, such as for an object detection system of the vehicle, a collision avoidance system of the vehicle, a pedestrian detection system of the vehicle, a headlamp control system of the vehicle, a lane departure warning system of the vehicle, a lane keep assist system of the vehicle, an adaptive cruise control system of the vehicle, and/or an automatic emergency braking system of the vehicle. The output or outputs may at least in part control one or more of the driving assist systems or one or more functions or operations of the vehicle. For example, the master or first or control ECU may be disposed in the vehicle and the slave or second ECU may be part of a camera or sensor or sensing system of the vehicle, and the synchronized outputs of the ECUs may control or provide outputs for one or more of the driving assist systems (e.g., automatic breaking systems, lane keep systems, lane centering systems, adaptive cruise control systems, etc.) of the vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least 1 million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, the vehicular control system comprising:

a first electronic control unit (ECU) disposed at a vehicle equipped with the vehicular control system;

a second ECU disposed at the equipped vehicle;

wherein the first ECU and the second ECU are in digital communication with one another via a communication link, wherein the digital communication via the communication link comprises communication of a first frame and communication of a second frame;

wherein the first ECU transmits the first frame to the second ECU via the communication link, wherein the first frame comprises a first bit pattern having a first sequence of binary digits;

wherein the second ECU, responsive to receiving the first frame from the first ECU, transmits the second frame to the first ECU via the communication link, wherein the second frame comprises a second bit pattern having a second sequence of binary digits;

wherein the first ECU, responsive to receiving the second frame from the second ECU, determines a propagation delay based on a time interval between (i) when the first ECU transmits the first frame to the second ECU and (ii) when the first ECU receives the second frame from the second ECU; and wherein the first ECU transmits a time synchronization frame to the second ECU via the communication link, and wherein the time synchronization frame comprises (i) the determined propagation delay and (ii) a timestamp indicative of a point in time when the frame synchronization frame is transmitted by the first ECU.

2. The vehicular control system of claim 1, wherein the first ECU comprises a first transceiver and the second ECU comprises a second transceiver, and wherein the first frame is transmitted by the first transceiver and received by the second transceiver and the second frame is transmitted by the second transceiver and received by the first transceiver.

3. The vehicular control system of claim 1, wherein the first frame indicates to the second ECU an intent to determine the propagation delay between the first ECU and the second ECU.

4. The vehicular control system of claim 1, wherein the first ECU determines the propagation delay based on a timer that (i) is started when the first ECU transmits the first frame to the second ECU and (ii) is terminated when the first ECU receives the second frame from the second ECU.

5. The vehicular control system of claim 4, wherein the first ECU determines the propagation delay by dividing a result of the timer by two.

6. The vehicular control system of claim 4, wherein the timer is an internal hardware timer.

7. The vehicular control system of claim 1, wherein the first ECU determines a back off time delay, and wherein the time synchronization frame comprises the back off time delay.

8. The vehicular control system of claim 7, wherein the time synchronization frame comprises a total propagation delay which comprises a sum of the propagation delay and the back off time delay.

9. The vehicular control system of claim 1, wherein the first bit pattern is different from the second bit pattern.

10. The vehicular control system of claim 1, further comprising a switch, wherein the first ECU transmits the time synchronization frame to the second ECU via the switch, and wherein the switch transmits the time synchronization frame to the second ECU with a switch propagation delay summed with the propagation delay.

11. The vehicular control system of claim 1, wherein the communication link comprises an Ethernet communication link.

12. The vehicular control system of claim 1, wherein the first ECU stores the determined propagation delay.

13. The vehicular control system of claim 1, wherein the first ECU is part of a driving assist system of the vehicle.

14. A vehicular control system, the vehicular control system comprising:
a first electronic control unit (ECU) disposed at a vehicle equipped with the vehicular control system;
a second ECU disposed at the equipped vehicle;
wherein the first ECU and the second ECU are in digital communication with one another via a communication link;
wherein the first ECU transmits, to the second ECU via the communication link, a first bit pattern having a first sequence of binary digits;
wherein the second ECU, responsive to receiving the first bit pattern from the first ECU, transmits, to the first ECU via the communication link, a second bit pattern having a second sequence of binary digits;
wherein the first ECU, responsive to receiving the second bit pattern from the second ECU, determines a propagation delay based on a time interval between (i) when the first ECU transmits the first bit pattern to the second ECU and (ii) when the first ECU receives the second bit pattern from the second ECU; and
wherein the first ECU transmits a time synchronization frame to the second ECU via the communication link, and wherein the time synchronization frame is comprises a timestamp and a correction time, and wherein the correction time comprises the determined propagation delay.

15. The vehicular control system of claim 14, wherein the first and second ECUs communicate Ethernet frames via the communication link, and wherein a first Ethernet frame communicated by the first ECU via the communication link comprises the first bit pattern and a second Ethernet frame communicated by the second ECU via the communication link comprises the second bit pattern.

16. The vehicular control system of claim 14, wherein the first ECU comprises a first transceiver and the second ECU comprises a second transceiver, and wherein the first bit pattern is transmitted by the first transceiver and received by the second transceiver and the second bit pattern is transmitted by the second transceiver and received by the first transceiver.

17. The vehicular control system of claim 14, wherein the first bit pattern indicates to the second ECU an intent to determine the propagation delay between the first ECU and the second ECU.

18. A vehicular control system, the vehicular control system comprising:
a first electronic control unit (ECU) disposed at a vehicle equipped with the vehicular control system;
a second ECU disposed at the equipped vehicle, wherein the second ECU generates a first output for at least one driving assist system of the equipped vehicle;
wherein the first ECU and the second ECU are in digital communication with one another via an Ethernet communication link, wherein the digital communication via the Ethernet communication link comprises communication of a first frame and communication of a second frame;
wherein the first ECU transmits the first frame to the second ECU via the Ethernet communication link, wherein the first frame comprises a first bit pattern having a first sequence of binary digits;
wherein the second ECU, responsive to receiving the first frame from the first ECU, transmits the second frame to the first ECU via the Ethernet communication link, wherein the second frame comprises a second bit pattern having a second sequence of binary digits;
wherein the first ECU, responsive to receiving the second frame from the second ECU, determines a propagation delay based on a time interval between (i) when the first ECU transmits the first frame to the second ECU and (ii) when the first ECU receives the second frame from the second ECU;
wherein the first ECU transmits a time synchronization frame to the second ECU via the Ethernet communication link, and wherein the time synchronization frame comprises (i) the determined propagation delay and (ii) a timestamp indicative of a point in time when the frame synchronization frame is transmitted by the first ECU; and
wherein the second ECU, at least partially responsive to receiving the time synchronization frame, generates a second output for the at least one driving assist system of the equipped vehicle.

19. The vehicular control system of claim 18, wherein the first ECU determines the propagation delay based on a timer that (i) is started when the first ECU transmits the first frame to the second ECU and (ii) is terminated when the first ECU receives the second frame from the second ECU.

20. The vehicular control system of claim 19, wherein the first ECU determines the propagation delay by dividing a result of the timer by two.

21. The vehicular control system of claim 19, wherein the timer is an internal hardware timer.

* * * * *